US011276080B2

(12) United States Patent
Hillman et al.

(10) Patent No.: US 11,276,080 B2
(45) Date of Patent: *Mar. 15, 2022

(54) CALL ANALYTICS FOR MOBILE ADVERTISING

(71) Applicant: Marchex, Inc., Seattle, WA (US)

(72) Inventors: Preston J. Hillman, Seattle, WA (US); Chris Jones, Seattle, WA (US); Adarsh S. Nair, Sammamish, WA (US)

(73) Assignee: Marchex, Inc., Seattle, WA (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/440,447

(22) Filed: Jun. 13, 2019

(65) Prior Publication Data

US 2020/0034880 A1 Jan. 30, 2020

Related U.S. Application Data

(63) Continuation of application No. 14/714,141, filed on May 15, 2015, now Pat. No. 10,332,148.

(51) Int. Cl.
*G06Q 30/00* (2012.01)
*G06Q 30/02* (2012.01)

(52) U.S. Cl.
CPC ..... *G06Q 30/0256* (2013.01); *G06Q 30/0267* (2013.01); *G06Q 30/0276* (2013.01)

(58) Field of Classification Search
None
See application file for complete search history.

(56) References Cited

U.S. PATENT DOCUMENTS

| 8,364,540 B2 * | 1/2013 | Soroca | G06F 16/9577 |
| | | | 705/14.64 |
| 10,332,148 B2 * | 6/2019 | Hillman | G06Q 30/0267 |
| (Continued) | | | |

FOREIGN PATENT DOCUMENTS

| CN | 102479190 A | * | 5/2012 | ......... G06Q 30/0247 |
| JP | 2013127642 A | * | 6/2013 | ............. G06Q 30/02 |
| (Continued) | | | | |

OTHER PUBLICATIONS

Gehler, Eric. "New Call-only Campaigns for AdWords." (Feb. 21, 2015 02:22 PM). Retrieved online Feb. 12, 2019. https://www.en.advertisercommunity.com/t5/Articles/New-Call-only-Campaigns-for-AdWords/ba-p/434712 (Year: 2015).*

(Continued)

*Primary Examiner* — James A Reagan
(74) *Attorney, Agent, or Firm* — Perkins Coie LLP

(57) ABSTRACT

A call analytics system for analyzing the effectiveness of advertising campaigns using performance data and call data. Specifically, the call analytics system evaluates the performance of different keywords in generating calls to displayed phone numbers. The call analytics system uses statistical techniques to correlate received calls to displayed phone numbers with those keyword or keywords that were associated with displayed advertisements. The system gives advertisers the ability to track and measure which keywords drive sales for mobile users that call advertisers directly from ads on their smartphones or other mobile devices. In some embodiments, the system uses the calculated effectiveness of certain keywords to recommend changes to present or future advertising campaigns of the advertiser.

20 Claims, 6 Drawing Sheets

(56) References Cited

U.S. PATENT DOCUMENTS

| | | | | |
|---|---|---|---|---|
| 2009/0234711 | A1* | 9/2009 | Ramer | G06F 16/635 705/14.66 |
| 2009/0327083 | A1* | 12/2009 | Mathew | G06Q 30/0273 705/14.69 |
| 2011/0119126 | A1* | 5/2011 | Park | G06Q 30/02 705/14.45 |
| 2012/0123863 | A1* | 5/2012 | Kaul | G06Q 30/02 705/14.52 |
| 2012/0173326 | A1* | 7/2012 | Tao | G06Q 30/0244 705/14.43 |
| 2013/0254035 | A1* | 9/2013 | Ramer | G06Q 30/0256 705/14.62 |
| 2014/0314215 | A1* | 10/2014 | Duva | G06Q 30/0202 379/88.01 |
| 2015/0071427 | A1* | 3/2015 | Kelley | G06Q 30/0201 379/265.09 |
| 2015/0324815 | A1* | 11/2015 | Petti | G06Q 30/0202 705/7.31 |
| 2015/0379571 | A1* | 12/2015 | Grbovic | G06Q 30/0256 705/14.54 |
| 2016/0182720 | A1* | 6/2016 | Kaiser | G06Q 10/109 379/265.09 |
| 2016/0335668 | A1* | 11/2016 | Hillman | G06Q 30/0276 |
| 2017/0236148 | A1* | 8/2017 | James | G06F 16/9535 705/14.45 |

FOREIGN PATENT DOCUMENTS

| | | | | |
|---|---|---|---|---|
| KR | 20160130357 A | * | 11/2016 | G06Q 30/02 |
| WO | WO-2012071396 A1 | * | 5/2012 | G06Q 30/0247 |

OTHER PUBLICATIONS

• Google Ads Help. Imporove Your Conversion rate. (Feb. 8, 2012). Retrieved online Jul. 13, 2021. https://support.google.com/google-ads/answer/2404198?hl=en (Year: 2012).*

• Searchenginewatch. Google: 70% of Mobile Searchers Call a Business Directly From Search Results. (Sep. 24, 2013). Retrieved online Oct. 25, 2021. https://www.searchenginewatch.com/2013/09/24/google-70-of-mobile-searchers-call-a-business-directly-from-search-results-study/ (Year: 2013).*

• Profitworks. Are Ads on Google (Google Adwords Ads) an Effective and Profitable Marketing Method? (Mar. 23, 2013). Retrieved online Oct. 25, 2021. https://profitworks.ca/blog/342-are-ads-on-google-google-adwords-ads-an-effective-and-profitable-marketing-method (Year: 2013).*

* cited by examiner

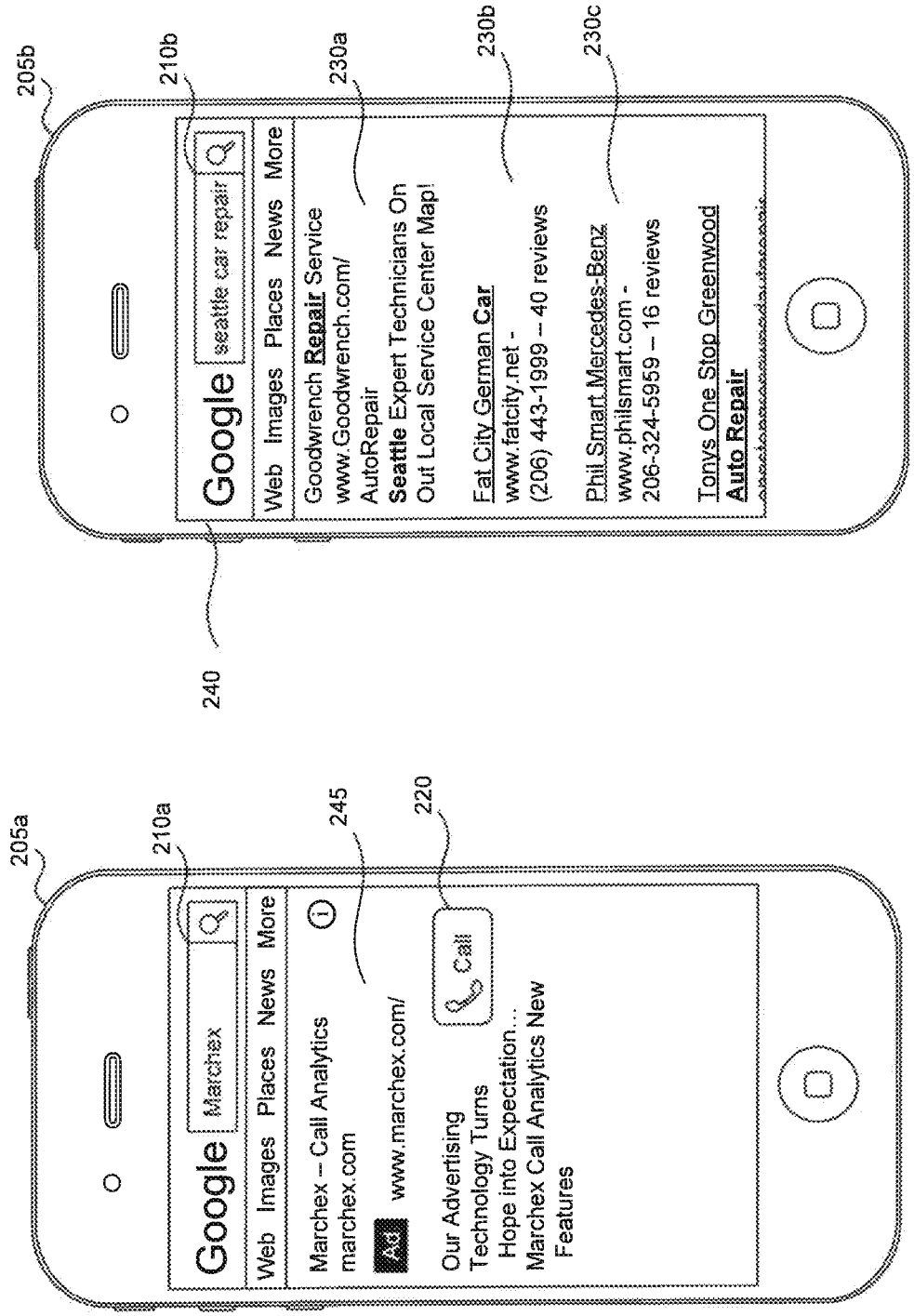

Performance Data

| Ad group ID | Ad group | Avg. Position | Campaign ID | Campaign | Clicks | Click type |
|---|---|---|---|---|---|---|
| 17373348603 | High School | 2 | 264676803 | TWC News -- San Antonio iC -- Non Brand ii Exact | 0 | Headline |
| 12566954602 | College | 1.5 | 365498701 | College admissions test -- Florida -- exact | 2 | Click to call |
| 13336954602 | Dentist | 3 | 425491601 | Dentist --Seattle--general check up visit Exact | 10 | Headline |
| ... | | | | | | |

| Device | Impression | Negative | Match Type | Keyword |
|---|---|---|---|---|
| SAMSUNG | 2 | FALSE | Exact | High School Football |
| IPHONE | 8 | True | Exact | College SAT test |
| Mobile | 100 | FALSE | Broad | Dentist check-up Seattle |
| ... | | | | |

FIG. 3B

CALL ANALYTICS FOR MOBILE ADVERTISING

CROSS-REFERENCE TO RELATED APPLICATION(S)

This application is a continuation of U.S. patent application Ser. No. 14/714,141 entitled "CALL ANALYTICS FOR MOBILE ADVERTISING" filed on May 15, 2015, the disclosure of which is incorporated herein by reference in its entirety.

BACKGROUND

Many businesses and organizations rely on internet advertisements that include phone numbers to attract customers. An increasing number of these advertisements are viewed on mobile phones as consumers find it increasingly convenient to find products or services using their mobile devices. To locate products or services, potential customers typically use keyword searches on search engines. In addition to search results, most search engines display several advertisements that are relevant to the searched keywords. The advertisements may be displayed with or without phone numbers.

Businesses pay online advertising networks (e.g., ADWORDS by GOOGLE, Yahoo Search Marketing by YAHOO!) for the placement of advertisements next to search results or on other websites based on keywords. For example, NIKE may bid on the keywords "basketball" and "shoes" using ADWORDS, and when a customer searches for phrases containing these keywords, GOOGLE will display NIKE'S advertisement next to the search results. The placement of the advertisement typically depends on the amount bid on the keywords as compared to other companies advertising using similar keywords. In the displayed advertisement, the search provider may provide a "click-to-call" feature that allows customers to call a forwarding phone number to connect to the advertiser associated with the displayed advertisement.

Companies spend a tremendous amount of money for these mobile ads. In 2014, for example, advertisers spent more than $4 billion on mobile search ads to drive calls. However, while companies continue to spend a significant amount on advertising campaigns, companies are typically unaware of the return on investment and success of these ads. For example, there are few tools that allow advertisers to judge the ability of advertisements to drive calls to displayed telephone numbers in those advertisements. By failing to provide these tools, businesses are unable to optimize their return on investment ("ROI") for displayed ads.

The need exists for systems and methods that overcome the above problems, as well as provide additional benefits. Other limitations of existing or prior systems will become apparent to those of skill in the art upon reading the following Detailed Description.

BRIEF DESCRIPTION OF THE DRAWINGS

FIGS. 2A and 2B illustrate example interfaces found on mobile devices in the environment of FIG. 1.

FIGS. 3A and 3B depict representative tables with relevant call data and performance data that are used to assess the performance of keywords associated with advertising campaigns.

DETAILED DESCRIPTION

Figure 1:
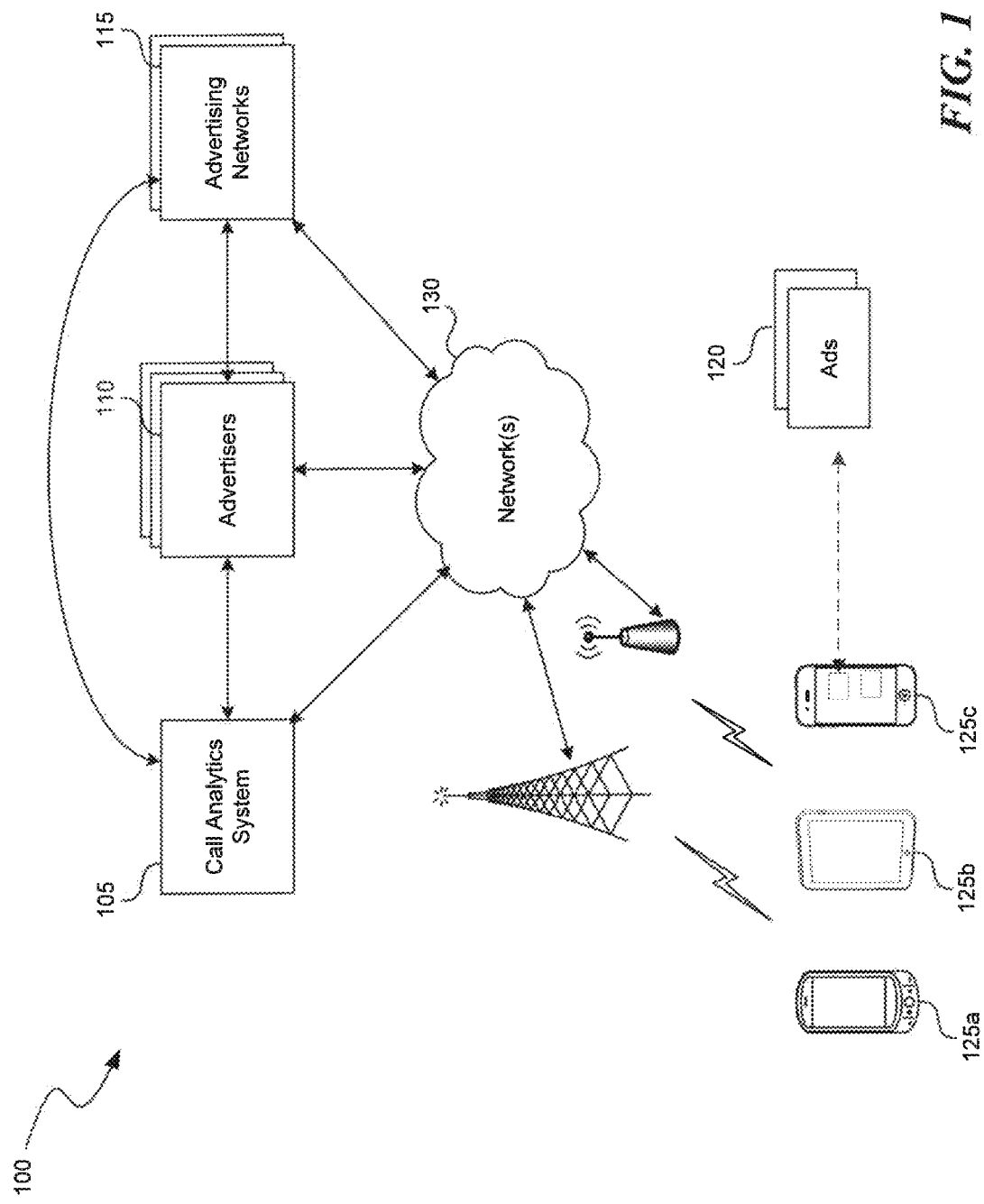
FIG. 1 is a block diagram illustrating an environment in which a call analytics system for search and mobile advertising operates.

A call analytics system for analyzing the effectiveness of advertising campaigns ("ad campaigns" or "campaigns") using performance data and call data is disclosed herein. Specifically, the call analytics system may be used to assess the effectiveness of advertisements that include phone numbers, and in particular to evaluate the performance of different keywords in generating calls to displayed phone numbers. The call analytics system uses statistical techniques to correlate received calls to displayed phone numbers with those keyword or keywords that were associated with displayed advertisements. The system gives advertisers the ability to track and measure which keywords drive sales for mobile users that call advertisers directly from ads on their smartphones or other mobile devices. In some embodiments, the system uses the calculated effectiveness of certain keywords to recommend changes to present or future advertising campaigns of the advertiser.

Present online advertising networks fail to provide advertisers with sufficient information about the performance of advertisements that are displayed on mobile devices and used by consumers to place calls to displayed numbers. For example, a travel agent may pay to have ads displayed when certain keywords are entered by consumers (e.g., "travel"+"Greece," "vacation"+"Greece," "cruise"+"Greece"). The displayed advertisements may have a phone number or phone numbers displayed, such as on a click-to-call button. While the travel agent may experience an increase in business from the displayed ads, the travel agent may not know which keywords or combination of keywords are the most likely to result in received calls or conversions. For example, the travel agent may receive more phone calls from people who search for combinations of "vacation"+"Greece," as compared to "travel"+"Greece," but has no way of determining this. The travel agent may want to know: which keyword was the most cost effective? Which keywords caused customers to call more or less? Did certain keywords result in more sales?

Present online advertising networks do not provide advertisers with sufficient information to answer these questions. Although advertising networks generally provide details on how often keywords were searched, how many times someone clicked on a search result associated with a keyword(s), how many times a person who searched for the keywords clicked on an ad ("click data"), and how many times a person saw the result for the keyword in a search result but did not click on it ("impression data"), advertising networks typically do not provide similar statistics for call data. To receive such information typically requires paying the advertising network for a call forwarding number that is displayed in the advertisement. When a call forwarding number is leased from an advertising network, the advertising network will often provide information to the advertiser of how many consumers clicked on a "click-to-call" button associated with that advertisement. Advertising networks do not, however, provide data for other phone numbers that are not call forwarding numbers. Indeed, because of the logical and sometimes physical separation between the data networks through which advertisements are distributed (e.g., in search results and webpages) and the telecommunication networks through which calls are made (e.g., using a mobile phone), it can be very difficult for a single party to obtain all information necessary to establish a connection between advertisements and calls. The information gap caused by such architectural network issues is profound.

The system described herein fills that gap by providing advertisers with keyword performance data based on a statistical correlation of call data and advertising performance data. That is, in the absence of direct correlation data, the system estimates whether calls received during certain timeframes were associated with advertisements displayed during those timeframes. Using such information, the system can recommend that the travel agent use the more specific keywords "travel+Athens, Greece," and "travel+Delphi, Greece" and "travel+Crete, Greece," as compared to "travel+Greece." The system determines that the statistical correlation between advertising performance data and phone calls demonstrates that breaking out ad groups into cities (and not bundling them together in "Greece") drives more calls and costs less.

There are several advantages to the disclosed system. First, advertisers will be able to better target mobile advertising, because the system will help optimize the selection of keywords to target certain markets and customers. Second, advertisers will save money by adjusting keyword selection to the most cost effective or the best return on investment. Ultimately, advertisers will attract more customers for less cost, because the system will facilitate the adjustment of keywords for ad campaigns to optimize the number of customers calling from keyword-generated searches.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Illustrative Environment

FIG. 1 is a block diagram illustrating an environment 100 in which a call analytics system 105 operates to provide call analytics data for search and mobile advertising. In the environment, consumers use mobile devices 125a-c, such as cell phones, smartphones, or advanced mobile devices, to search for products and services of interest. Mobile devices 125a-c can wirelessly connect to and communicate data over one or more networks 130, including public or private networks (e.g., the Internet). For example, using mobile device 125a a consumer may search for a local ice cream store. Mobile devices 125a-c also have the ability to place phone calls via the networks 130. For example, a person who was displayed an advertisement for a local ice cream store could place a call to a phone number listed in the advertisement.

Mobile devices 125a-c receive advertisements that are distributed by online advertising networks 115 over networks 130. Advertising networks are entities that distribute advertisements for display against search results or on affiliated websites. Some significant online advertising networks are currently operated, for example, by GOOGLE (ADWORDS and DOUBLECLICK), MICROSOFT (Bing Ads), and YAHOO! (Yahoo!Search Marketing). Using various search services, mobile devices 125a-c can search the World Wide Web for content of interest. Advertising networks 115 provide advertisements for display against content identified by searching or browsing. For example, when a user searches for "bowling alleys in Seattle," an advertising network will provide relevant ads for display to the user.

Advertisers 110 include businesses, organizations, groups of people, governmental agencies, individuals, etc. For example, an advertiser 110 can be NIKE, MICROSOFT, SIERRA CLUB, or a personal trainer. Advertisers 110 want to reach consumers to garner business or attention. One way advertisers 110 can connect with consumers is through advertising networks 115. To specify how advertisements are distributed, an advertiser will typically generate an ad campaign with the advertising network. Ad campaigns typically are specified by some or all of the following parameters: campaign name (e.g., name or theme for advertising), type of advertisement (e.g., search only, display only, search and display), network where the ad will appear (e.g., on GOOGLE or on non-GOOGLE sites), devices that should receive the ad (e.g., desktops, tablets, and mobiles), languages and locations where the ad may be displayed, bidding and budget strategy associated with the ad (e.g., bid strategy specifies how much an advertiser is willing to pay for users to interact with ads), and available ad formats (e.g., text ad, image ad, rich media ad, videos).

Each ad campaign has one or more advertisements 120 that are displayed to consumers on mobile devices 125. Ads 120 are typically displayed on the mobile device interfaces next to search results, on webpages, or by themselves. Displayed ads can also appear in documents, messages, emails, and other sources of electronic content.

The call analytics system 105 communicates with advertisers 110 and advertising networks 115. In some embodiments, the call analytics system 105 receives details about one or more ad campaigns from the advertisers 110. For example, as previously discussed, call analytics system 105 can receive advertising copy including phone numbers associated with an advertising campaign, keyword lists, bidding strategy, and advertising distribution network preferences. Moreover, the advertisers 110 can provide internal advertiser information that was not provided to the advertising network regarding the ad campaign. For example, the internal advertiser information may include call data such as the number and time of received calls to the advertiser via different phone numbers. Internal advertisers may also include bidding information for ad campaigns or call data such has who spoke with consumer. Call data is described further with respect to FIG. 3A.

The call analytics system 105 also receives performance data from advertising networks 115. Performance data includes, for example, the number of ad impressions, the click-through rate on advertisements, and average cost paid per advertisement. Additional detail regarding performance data will be described with respect to FIG. 3B. As will be described in additional detail herein, by correlating the performance data with the call data, the call analytics system 105 assesses the effectiveness of ad campaigns in generating calls to displayed numbers. Using such assessment, the call analytics system can recommend improvements to the performance of ad campaigns.

Network 130 allows for communication in environment 100. Network 130 may include via or more wireless networks such as, but not limited to, one or more of a Local Area Network (LAN), Wireless Local Area Network (WLAN), a Personal Area Network (PAN), Campus Area Network (CAN), a Metropolitan Area Network (MAN), a Wide Area Network (WAN), a Wireless Wide Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. Network 130 may also include wired networks.

FIGS. 2A and 2B are representative interfaces that may be displayed on mobile devices 125a-c. In these example interfaces, a user searched the internet using a web browser or application on a mobile device 125a-c. The user entered keywords 210a and 210b into a search service (e.g., GOOGLE). Keywords are words or phrases describing a product or service that advertisers 110 choose to guide when and where an ad can appear.

FIG. 2A shows a click-to-call button 220. Click-to-call is a form of communication in which a person clicks an object (e.g., button, image or hyperlink) to request an immediate connection with another person by a phone call. When a user selects the displayed object, the application generating the interface 205a will cause the phone number associated with that object to be called. Click-to-call (also known as click-to-talk) requests can be placed in text ads, banner ads, documents, email, blogs, wikis, flash animations or video, and other internet-based objects. Ad 245 in FIG. 2A is an example of an ad that appears when a user searches for MARCHEX on the mobile device interface 205a. If a user selects the displayed click-to-call button, the user's mobile device will call MARCHEX via the corresponding number. Advertising networks 115 typically track clicks on click-to-call buttons and report this call information to advertisers 110 or the call analytics system 105.

FIG. 2B is an example mobile device interface 205b with search results for "Seattle car repair." Interface 205b does not contain a click-to-call button in the search results. Instead, the second search result 230b has a phone number displayed in the headline of the ad, which is known as headline placement. Advertising networks 115 typically allow advertisers 110 to display phone numbers in the headline. Advertisers 110 can choose these phone numbers to be general business numbers or numbers dedicated to an ad or ad campaign. Also, as shown in example interface 205b, there are several other advertisers 110 that paid for (e.g., "bid on") ads/search results 230a-c, and these ads or search results show up on interface 205b. Depending on the algorithm and bidding process used by the advertising network 115, the results will appear in a certain order. If a consumer makes a call to any of the numbers in the displayed advertisements by, for example, selecting or keying-in the displayed phone number on the mobile device or on another phone, the call information it typically not reported by the advertising network.

Figure 3A:
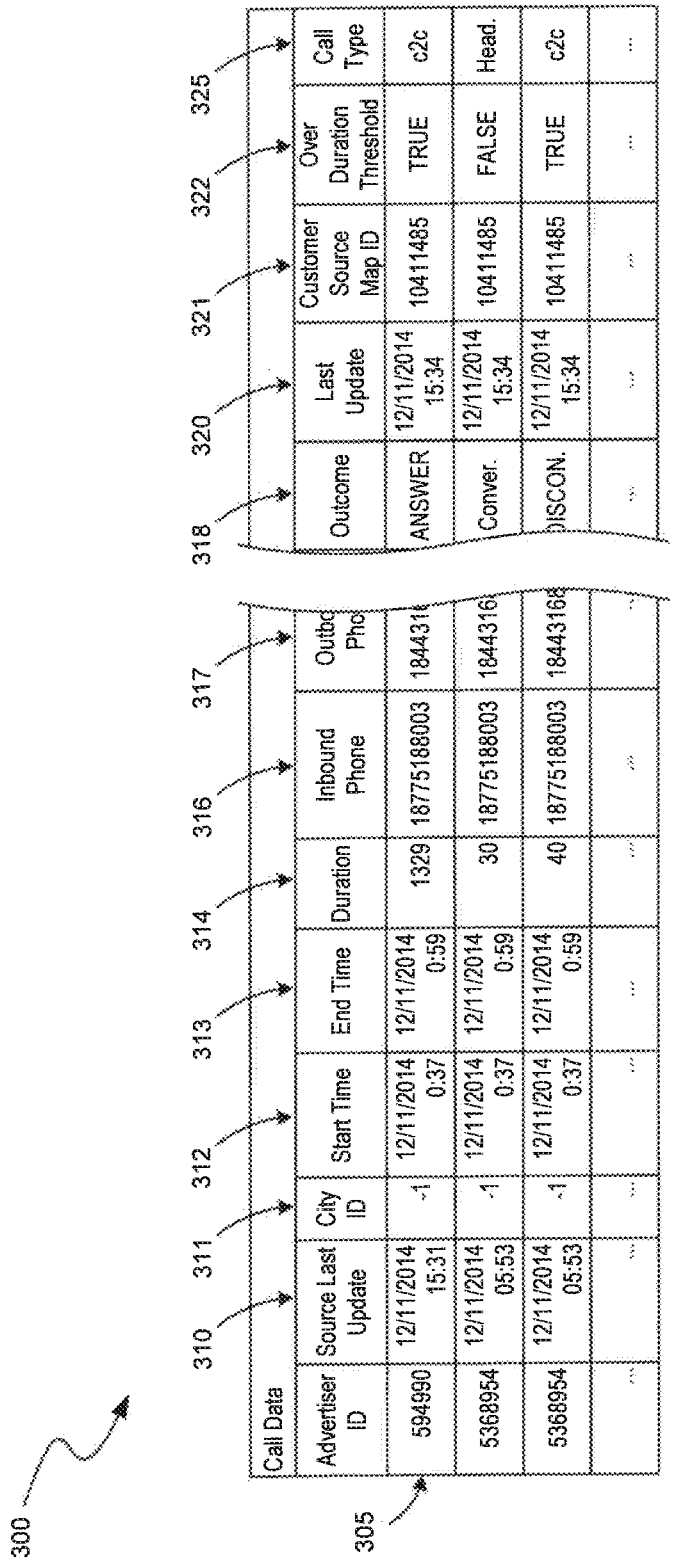

FIG. 3A illustrates an example of a call data table 300 that contains call information associated with one or more advertisers. Call data table 300 includes information about calls placed to specific phone numbers that are associated with each advertiser or advertisers. Each row in the table reflects a single call to an advertiser. Each column in the table contains data characterizing or associated with the call. Call data table 300 is updated continuously, periodically, or sporadically. Call data table 300 is generated by monitoring call traffic received by the advertiser over a phone or data network (e.g., a VoIP call). The call analytics system 105 can directly compile the call data if it is providing call tracking numbers to the advertiser for purposes of tracking performance of the ad campaign or ads. For example, the call analytics system 105 may assign three phone numbers to an advertiser to use in an ad campaign and the call analytics system 105 may host these numbers. Calls received by the three phone numbers are routed by the call analytics system to a single phone number associated with the advertiser. In this fashion, the call analytics system 105 may collect calling data that is received for these three phone numbers. Alternatively, the call analytics system 105 can receive the call data from a telecommunications provider (e.g., T-MOBILE) or directly from the advertiser.

The call data table 300 includes an advertiser ID column 305, which contains unique identifiers that are used by the call analytics system 105 to associate each call with a corresponding advertiser. As shown in FIG. 3A, "594990", "5268954", and "5368954" are examples of advertiser IDs; these numbers link each call to the advertiser that received the call. A "source last update" column 310 in the call data 300 table is the time the data contained in the corresponding row was initially received.

Call data table 300 includes a City ID column 311 that is used to identify the city where the call was placed from. One with ordinary skill in the art will appreciate that the data used to populate the City ID column 311 can be GPS coordinates, regions, or relevant location data (e.g., area code).

Call data table 300 also includes data characterizing the length of the call. The table includes a start time column 312 and an end time column 313 that contain data reflect the starting and ending time of a call. Also, a duration column 314 includes the total duration of the call (e.g., in seconds). The duration may be calculated from the start time and end time of the call, or duration data can be provided by the phone network (e.g., T-MOBILE).

Call data table 300 includes inbound phone column 316 and outbound phone column 317. Inbound phone column 316 contains data characterizing the number that was dialed. For example, if a customer called a number on an ad, the number in the ad would be the inbound phone number. Outbound phone column 317 contains data characterizing a forwarding phone number if the call is forwarded to another calling system. For example, advertisers may use call tracking numbers that are provided from the call analytics system 105 or a phone company in an ad campaign. Calls to the call tracking numbers, however, are routed to a single number associated with the advertiser. In that case, the outbound phone data reflects the number to which the calls are routed. Advertisers 110 can pick the number of inbound and outbound phone numbers used in their ad campaigns depending on cost or ad campaign goals.

Call data table 300 includes an outcome column 318, which contains data characterizing the call. The call outcome may be determined by the call analytic system 105 or by the advertiser. For example, if the duration of the call is zero seconds, the call analytics center can determine that the call was "not answered" or "disconnected." Other outcomes include "answered" or "conversion." Conversions happen when a potential customer takes an action that is defined as valuable to the advertiser 110, such as a purchase from the advertiser or a request for additional information from the advertiser. Conversions help advertisers 110 understand how much value ads bring in. Outcome data (disconnected, conversions, etc.) may be determined by the systems and methods described in U.S. patent application Ser. No. 13/842,769, entitled "SYSTEM AND METHOD FOR ANALYZING AND CLASSIFYING CALLS WITHOUT TRANSCRIPTION," filed on Mar. 15, 2013, and hereby incorporated by reference in its entirety.

Call data table 300 includes a last update column 320, which contains data reflecting the last time a row in the table was updated. For example, if updated outcome data about a call is received and the table updated to reflect that outcome, the last update column will include the time and date that the outcome data was received. As discussed below, last update information can be used in determining a first and second factor.

Call data table 300 includes customer source map ID 321, which contains data that is used to assist the call analytics system 105 in organizing and mapping the call data. For example, the source map ID data may be used to associate certain ad groups or campaigns of an advertiser.

Call data table 300 also includes a duration threshold column 322 which includes information as to whether or not the corresponding phone call exceeded a certain length. The length of the call, and the comparison with a certain threshold, can be determined using the systems and methods described in U.S. patent application Ser. No. 13/842,769 (discussed above).

Call data table 300 includes a call type column 325 which contains data explaining how the phone number was displayed on the corresponding advertisement. For example, the phone number may have been presented in a click-to-call button ("c2c", which is described in FIG. 2A) or in a headline of the ad ("headline").

It will be appreciated that the call data table 300 shown in FIG. 3A is merely representative of the type of data that may be compiled by the call analytics system. Some of the depicted data may be omitted from the collected data, and other data that is not depicted may be added to the collected data. Moreover, while depicted in the form of a table, it will be appreciated that that compiled data may be stored in any form (e.g., linked list, database, flat files) that allows convenient analysis by the system.

FIG. 3B depicts a representative performance data table 330 that contains data reflecting the efficacy or performance of different advertising groups. The data in the performance data table 330 is typically received from operators of advertising networks. Each row in the table reflects the performance of an advertising group. Each column in the table contains data characterizing or associated with the advertising group. The performance data table 330 includes, but is not limited to: an ad group ID column 335, ad group column 340, average position column 345, campaign ID column 350, campaign column 355, clicks column 360, click type column 365, device column 375, impression column 380, negative column 385, match type column 395, and keywords column 396. The data contained in each column will be addressed in turn herein.

The ad group ID column 335 contains unique identifiers that are used by the call analytics system 105 to track the performance of certain groups of advertisements. The ad group ID can be used to track the performance of an ad group within a campaign. For example, if a campaign has several ad groups, each ad group within the ad campaign can be identified by a unique ad group ID. The ad group ID may be associated with a descriptive word or phrase that is stored in ad group column 340.

The average position column 345 contains data characterizing the average position of ads in the ad group that appear on a search results page. The average position is characterized with respect to the "top" or "first" position (e.g., second, third, etc.). Positions one through 10 usually appear on the first page of search results.

The campaign ID column 350 contains data which identifies the specific campaign ID that the ad group is assigned to. As previously noted, a particular advertising campaign may comprise one or more ad groups. The campaign ID therefore allows campaigns spanning multiple ad groups to be monitored. The campaign may be associated with descriptive text or notes in the campaign column 355.

The clicks column 360 includes data reflecting how many times a consumer clicked on a campaign advertisement. The click type column 365 contains data characterizing how the phone number was displayed on the ad. For example, the phone number could have been displayed in a headline or in a click-to-call button.

The device column 375 includes information about the calling device. For example, the device can be a mobile or a tablet with full browsers and calling ability. One with ordinary skill in the relevant art can appreciate device 375 can include the exact type of device. This information can be relevant to advertising companies and used in calculating effectiveness of keywords in ad campaigns as described below.

The impression column 380 contains data indicating the number of times a campaign ad was shown to a potential consumer. Impressions are recorded each time an advertisement is shown, regardless of whether the consumer takes any action associated with the advertisement. As will be described below, impression data may be used in calculating the effectiveness of keywords in ad campaigns.

The negative column 385 includes information on whether any negative keywords were contained in the corresponding advertising campaign. Negative keywords are a type of keyword that prevents an ad from being triggered by a certain word or phrase. Advertising networks 115 will not show an ad to anyone who is searching for a phrase containing a negative keyword. For example, if an advertiser is running a shoe store ad for only men's shoes, the advertiser may consider adding "women" and "girls" as negative keywords to prevent the ad from showing when people search for "Women's shoes" or "girls' shoes."

The match type column 395 includes information on whether the specified advertising campaign enabled or disabled exact matching for the campaign. A broad match means ads or search results automatically run on relevant variations of keywords, even if these terms are not in the keyword lists. Broad matching may help attract more visitors to the ad campaign. However, when using broad matching, phone calls may be received from a broadly-matched keyword unrelated to the purpose of the ad. An example of the operation of broad keyword matching is provided in Table 1.

TABLE 1

| Broad match keyword | Ads may show on searches for |
|---|---|
| low-carb diet plan | carb-free foods low-carb diets low calorie recipes |

In contrast, an exact match shows results for an ad to customers who are searching for that exact keyword, or close variants of that exact keyword, exclusively. With exact match, ads will appear when a potential customer enters a search string that contains keyword(s) that exactly match the selected keyword(s). Advertisers 110 can use exact match to limit who sees the ad to only those who search for the exact keywords or close variants of the exact keywords. An example of the operation of exact keyword matching is provided in Table 2.

TABLE 2

| Exact match keyword | Ads may show on searches for | Ads will not show on searches for |
|---|---|---|
| tennis shoes | tennis shoes | red tennis shoes<br>buy tennis shoes |

The keywords columns 396 contains those keywords that are associated with the corresponding advertising campaign. The keywords include one or more phrases or words that advertisers select to determine when an ad can appear. Keywords are used to match ads with terms that people are searching for or webpages or other content that people are viewing. Proper selection of keywords allows advertiser to reach customers that are looking for particular products or services of the advertiser. Examples in the keyword 396 column are keywords "high school football" which might be used, for example, to target advertisements for football equipment, or "college SAT test" which might be used by an advertiser offering test prep courses.

The advertising performance data that populates table 330 is typically provided to the advertiser (and then to the call analytics system 105) or directly to the call analytics system 105 by operators of advertising networks. One with ordinary skill in the relevant art can appreciate that other columns can be added to performance data table 330 such as: color of ad, time it took average user to find ad, gender of customer searching for ad, time of day that ad was found or shown, and session data. Additional data can include the status of the ad (e.g., enabled, disabled, or suspended). Also, additional data can include advertiser-provided data: the advertiser may include cost of ad campaigns, its own customer data, its bidding strategy, etc. The performance data table 330 shown in FIG. 3B is therefore merely representative of the type of data that may be compiled by the call analytics system. Some of the depicted data may be omitted from the collected data, and other data that is not depicted may be added to the collected data. Moreover, while depicted in the form of a table, it will be appreciated that that compiled data may be stored in any form (e.g., linked list, database, flat files) that allows convenient analysis by the system.

Figure 4:
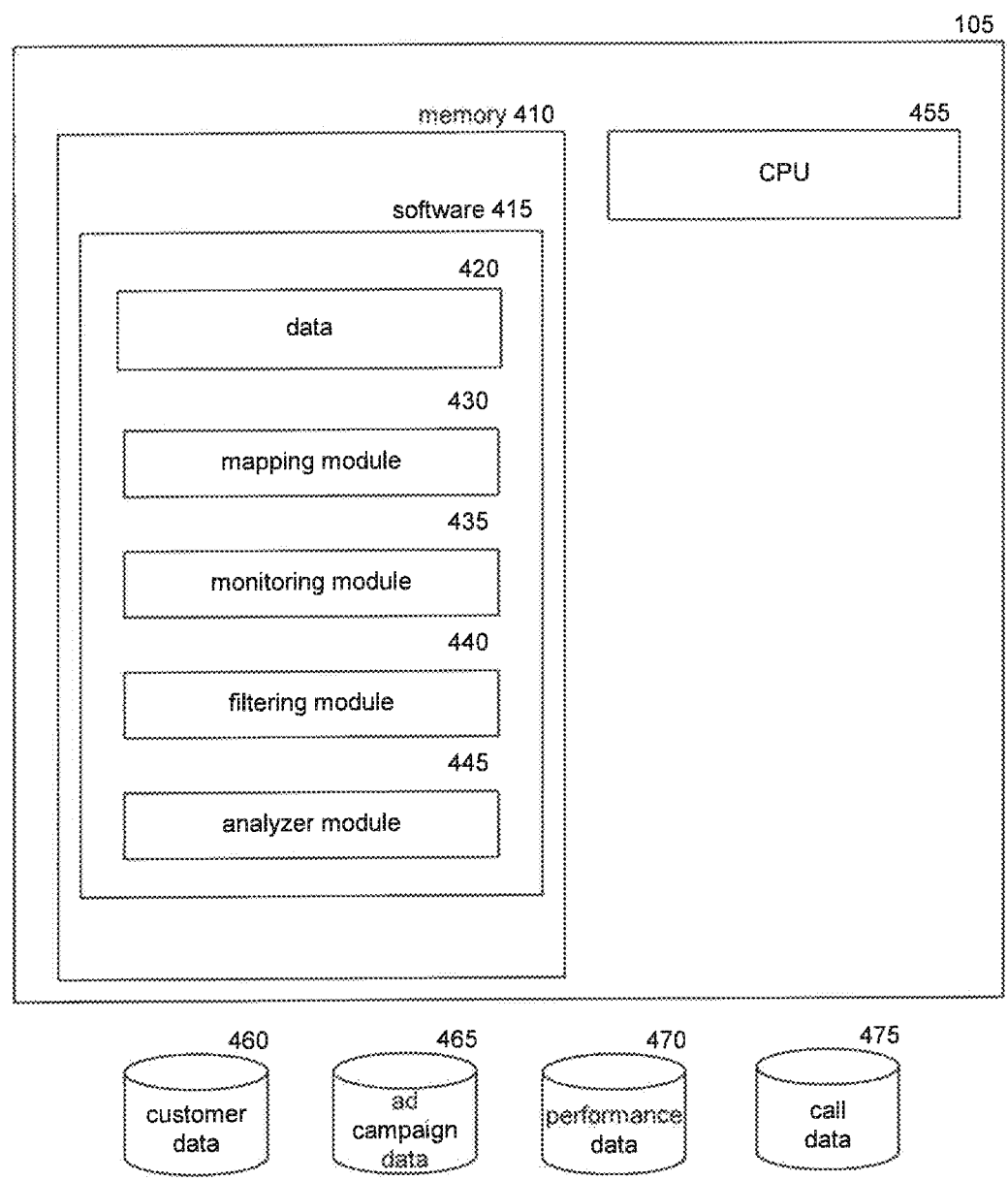
FIG. 4 is a block diagram illustrating elements of the call analytics system.

FIG. 4 is a block diagram illustrating the exemplary elements of the call analytics system 105 of FIG. 1 in more detail. As shown in FIG. 4, the call analytics system 105 includes one more central processing units (CPU) 455 for executing software 415 stored in memory 410.

Memory 410 stores software 415 comprised of one or more modules and data 420 utilized by the modules. The modules perform certain methods or functions of the system 105 described herein, and may include components, subcomponents, or other logical entities that assist with or enable the performance of some or all of these methods or functions. System modules include a mapping module 430, a monitoring module 435, a filtering module 440, and an analyzer module 445, each of which will be described in more detail below.

The mapping module 430 maps call data (e.g., contained in call data table 300) to performance data received from advertising networks (e.g., contained in performance data table 330). The mapping module 430 may comprise any combination of software agents and/or hardware components able to receive and process call and performance data. The mapping module 430 tracks associations between advertisers, phone numbers, and ad campaigns. For example, an advertiser may have several ad campaigns (e.g., one for men's shoes, one for women's shoes, and one for kid's shoes), each of which uses separate phone numbers. In addition, the mapping module 430 tracks the advertising networks (e.g., GOOGLE, YAHOO!) on which ad campaigns are being distributed. The mapping module 430 connects to and uses data from customer data database 460, ad campaign data database 465, performance data database 470, and call data database 475. As a broad overview, the mapping model 430 maintains relationships between advertisements, phone numbers, and advertisers.

The monitoring module 435 updates the call data and performance data as shown in FIGS. 3A and 3B. The monitoring module 435 may comprise any combination of software agents and/or hardware components able to receive, process, and update data from advertising networks, advertisers, or other sources. The monitoring module 435 updates the call and performance data periodically (e.g., daily, hourly, weekly) or sporadically (e.g., when the call analytics system requests updated information, when advertising networks or advertisers provide such information). The monitoring module 435 communicates with, stores, and uses data from the following databases: customer data 460, ad campaign data 465, performance data 470, and call data 475. The monitoring module 430 can communicate with the mapping module 430, the filtering module 440, and the analyzer module 445.

In some embodiments, the monitoring module 435 maintains a phone call count. For example, based on call data, the monitoring module 435 can calculate the total number of phone calls for each number (e.g., adding all the phone calls received for a particular phone number). The monitoring module 435 stores the total count for phone numbers in call data database 475. The monitoring module 435 communicates with the filtering module 440 in order to isolate data related to a specific advertiser, phone number, or ad campaign.

The filtering module 440 filters call data and performance data, such as reflected in FIGS. 3A and 3B. The filtering module 440 may comprise any combination of software agents and/or hardware components to perform such filtering. The process of filtering involves identifying data corresponding to certain search criteria. For example, the filtering module 440 may identify all phone calls and phone numbers for a specific ad campaign. The filtering module 440 filters using the known IDs (e.g., advertiser ID, customer source map ID, campaign ID, and ad group ID) and the associated ad campaign phone numbers. In some embodiments, the filtering module 440 organizes all the performance data and call data for a particular ad campaign into one table (e.g., a condensed version of FIGS. 3A and 3B). The filtering module 440 can filter the call data and performance data based on different criteria, such as ad campaign, phone number, keywords, device type, click type, etc.

The analyzer module 445 calculates the effectiveness of keywords in ad campaigns. In such embodiments, the analyzer module 445 transmits an adjusted list of keywords for ad campaigns to advertisers 110 or advertising networks 115. The analyzer module 445 may comprise any combination of software agents and/or hardware components able to receive and process the call and performance data, in order to calculate the effectiveness of keywords. Specifically, the analyzer module 445 performs a statistical analysis of keywords in ad campaigns to calculate effectiveness. Operation of the analyzer module will be described in additional detail with respect to FIG. 5.

As shown in FIG. 4, the system may access many datasets, namely customer data 460, ad campaign data 475, performance data 470, and call data 475. These datasets are accessible by all the modules described above, and the modules can store information in these datasets or update information in these datasets continuously, periodically, or sporadically. Customer data 460 includes information about advertisers 110. For example, customer data can include advertiser contact information, the number of ad campaigns advertisers are running, billing information, and other relevant business information. Customer data 460 can contain ad group IDs, campaign IDs, advertiser ID, customer source map IDs, and other relevant customer identification information. Ad campaign data 465 can include any information related to ad campaigns. For example, ad campaign data can include the list of keywords for an ad campaign and the different ad groups. Ad campaign data can also include all the ad campaigns for a customer or all the ad campaigns for a certain field of business (e.g., ad campaigns for men's shoes). Performance data 470 includes performance data, such as data described in conjunction with FIG. 3B. Call data 470 includes call data, such as data described in conjunction with FIG. 3A.

Figure 5:
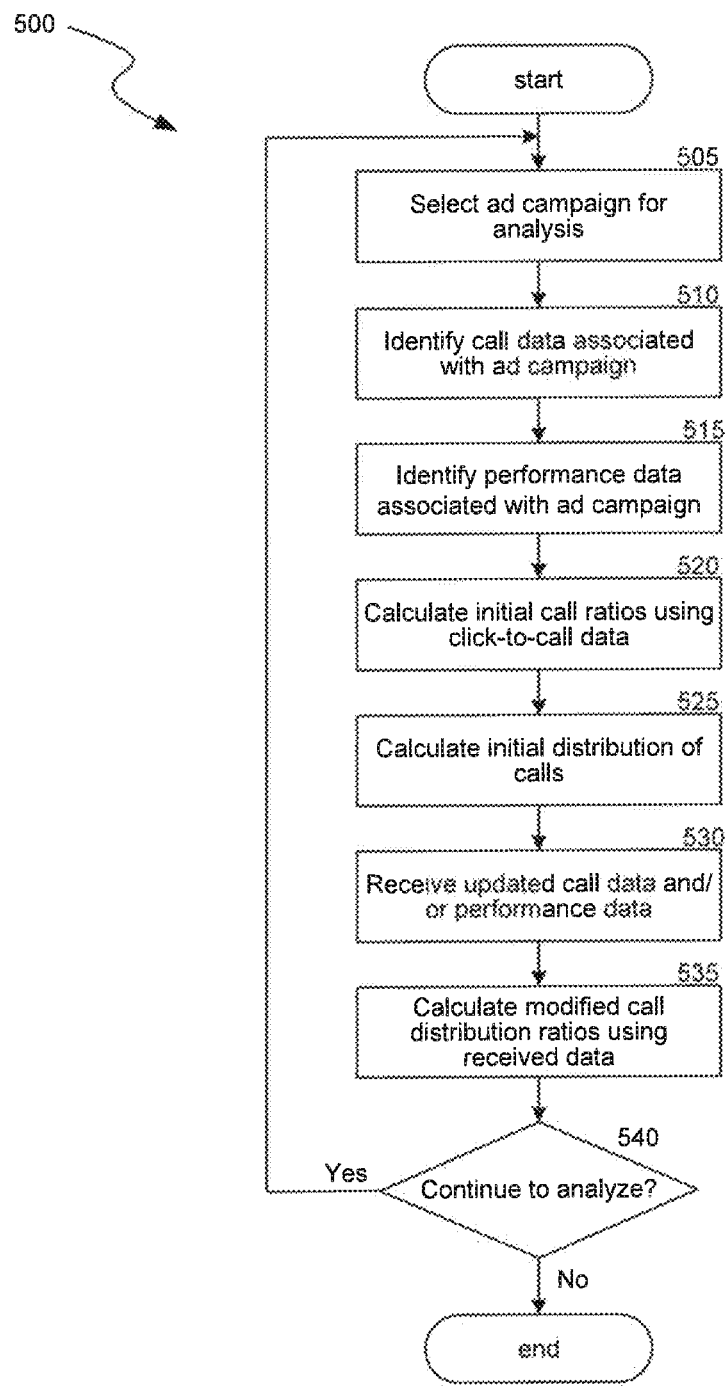
FIG. 5 is a flowchart illustrating a process implemented by the call analytics system for generating call analytics for an ad campaign.

FIG. 5 is a flowchart illustrating a process implemented by the call analytics system 105 to correlate call data with performance data for a particular ad campaign. In step 505, a call analytics system 105 selects a particular ad campaign to analyze and retrieves data characterizing the selected ad campaign. For example, the call analytics system 105 can retrieve the advertising copy, sets of keywords used in the ad campaign (which may span one or more ad groups), advertising network information, and phone numbers for the advertising campaign. To the extent not already assigned by the advertiser or advertising network, the call analytics system 105 can generate group ID numbers and advertiser IDs as described in FIGS. 3A and 3B in order to associate the relevant ad campaign information to the advertisers. In some embodiments, call analytics system 105 can receive ad campaign information from advertising networks 115 or it can receive ad campaign information directly from the advertiser 110. An example of sets of keywords for an ad campaign for "Puppy food" that might be placed by a pet food company advertising is set forth in Table 4. Each set of keywords is identified with a unique ID.

TABLE 3

| Set of keywords | ID |
| --- | --- |
| Puppy food Seattle | A |
| Organic puppy food Washington | B |
| Natural puppy food Seattle | C |
| Puppy Show Seattle | D |
| Best puppy food in Seattle | E |
| Cheapest organic puppy food Seattle | F |

In retrieving advertising campaign data for analysis, the call analytics system 105 will retrieve phone numbers associated with each ad campaign. The phone numbers associated with the ad campaigns may be provided by the advertisers 110 or advertising networks 115. Alternatively, the call analytics system may have provided the phone numbers to the advertisers for use as call tracking numbers, which allows for the call analytics system 105 to directly collect certain performance data (e.g., certain portions of the data in FIG. 3A). In some cases, different phone numbers may be associated with different keyword permutations used to place advertisements. For example if there are five keywords/phrases that are being bid upon for a particular ad campaign, then there may be five phone numbers assigned to that ad campaign. Assigning phone numbers in this fashion creates a one-to-one relationship between keywords and phone calls. However, it is typically the case that there are more keywords or phrases than there are phone numbers. In that case, there will be many-to-one relationship between keywords and phone calls. An example list of three phone numbers that are all associated with a single ad campaign is provided in Table 5.

TABLE 4

| Ad phone numbers | ID |
| --- | --- |
| (800) 111-1111 | 1 |
| (800) 222-2222 | 2 |
| (800) 333-3333 | 3 |

In step 510, the call analytics system 105 identifies call data that is likely associated with the ad campaign. The call data is located in call data table 300 by identifying all calls with inbound telephone numbers that are associated with the ad campaign. In some embodiments, the call analytics system can calculate the total count of calls for each phone number. Table 6 is an example of calculating a total call count for an ad campaign having three phone numbers associated with the campaign.

TABLE 5

| Ad phone numbers | ID | Call count |
| --- | --- | --- |
| (800) 111-1111 | 1 | 455 |
| (800) 222-2222 | 2 | 145 |
| (800) 333-3333 | 3 | 400 |
| Total | | 1000 |

In step 515, call analytics system 105 identifies performance data contained in performance data table 330 that corresponds to the ad campaign being analyzed. The performance data is identified by selecting those ad groups (i.e., rows of data) corresponding to the ad campaign. The identified performance data does not contain sufficient data within it to allow the system to determine which calls were directly a result of the displayed advertisements. Instead, the system estimates which calls were a result of the advertising campaign using a two-phase process.

In a first phase, the call analytics system 105 uses initial distribution ratios to estimate which advertisements led to which calls. In some embodiments, the initial distribution ratios are calculated using click-to-call information in the performance data. The system first uses data in the "click type" column 365 to identify the count of calls that resulted from a known selection of the "click-to-call" button. An example of such filtered data is set forth in Table 7. In the depicted example, only 20 (of the 1000) calls originated from the click-to-call features. Of the 20 calls that originated by the use of the "click-to-call" button, for example, three of those calls were from advertisements that were part of an ad campaign using the keywords "natural" "puppy" "food" and "Seattle".

TABLE 6

| Set of keywords | ID | Click-to-call clicks |
| --- | --- | --- |
| Puppy food Seattle | A | 3 |
| Organic puppy food Washington | B | 4 |
| Natural puppy food Seattle | C | 3 |
| Puppy Show Seattle | D | 1 |
| Best puppy food in Seattle | E | 3 |
| Cheapest organic puppy food Seattle | F | 6 |
| Total | | 20 |

In step 520, the call analytics system 105 uses the click-to-call counts to calculate a ratio of phone calls received for each set of keywords in the ad campaign (e.g., how many phone calls were received for the puppy food campaign as a result of the keywords "puppy food Seattle"). The equation for generating the click-to-call ratio of phone calls associated with each set of keywords is as follows:

$$\left( \frac{\text{number of clicks for click-to-call for specific keywords}}{\text{total number of clicks for click-to-call for all keywords}} \right) = \text{click-to-call ratio} \quad \text{Equation (1)}$$

When the above equation is applied to the click-to-call data from Table 7, the following click-to-call ratios are determined for each set of keywords:

TABLE 7

| Set of keywords | ID | Click-to-call ratio |
| --- | --- | --- |
| Puppy food Seattle | A | 15% (3/20) |
| Organic puppy food Washington | B | 20% (4/20) |
| Natural puppy food Seattle | C | 15% (3/20) |
| Puppy Show Seattle | D | 5% (1/20) |
| Best puppy food in Seattle | E | 15% (3/20) |
| Cheapest organic puppy food Seattle | F | 30% (6/20) |
| Total | | 100% |

The ratios that are calculated by the system based on the click-to-call data are then extended across all calls in the call data. In step 525, the call analytics system 105 estimates the distribution of phone calls to keywords based on calculated ratios according to the following equation (2):

click-to-call ratio (keyword set)*total number of phone calls received for ad campaign=estimate of phone calls received (keyword set)   Equation (2)

Applying the calculated click-to-call ratios across all 1000 received calls associated with the ad campaign (Table 6) thereby generates the following distribution of calls:

TABLE 8

| Set of keywords | ID | Click-to-call ratio | Estimated distribution based on click-to-call ratio |
| --- | --- | --- | --- |
| Puppy food Seattle | A | 15% | 150 |
| Organic puppy food Washington | B | 20% | 200 |
| Natural puppy food Seattle | C | 15% | 150 |
| Puppy Show Seattle | D | 5% | 50 |
| Best puppy food in Seattle | E | 15% | 150 |
| Cheapest organic puppy food Seattle | F | 30% | 300 |
| Total | | 100% | 1000 |

While the click-to-call ratios were used as an initial metric by which to classify calls, it will be appreciated that other metrics might be used in lieu of the click-to-call data. For example, impressions data from the performance data may be used to calculate initial ratios. The initial distribution ratios calculated with impression data could then be used to generate the estimated distribution of all calls. One with ordinary skill in the art will appreciate that a variety of different metrics might be used by the system 105 in the initial phase to establish distribution ratios.

Based on the initial distribution ratios, advertisers may elect to change their selection of keywords associated with particular ad campaigns. Advertisers may, for example, elect to shift more spend toward those keyword combinations that appear to be responsible for a higher number of calls to displayed phone numbers.

In a second phase, the call analytics system 105 refines the estimated distribution based on additionally-received data. In step 530, the call analytics system 105 receives updated call data and performance data. The additional data may reflect additional performance and call data associated with the ad campaign as the ad campaign runs for additional time. Alternatively or additionally, the additional data may reflect updates to existing call data as a better assessment is made of the outcome of calls received by the advertiser. The call analytics system 105 uses the additional data to refine the call distribution ratios.

In step 535, the call analytics system 105 calculates modified distribution ratios using the updated call and performance data. The initial distribution ratios may be modified for one of two reasons. First, the initial distribution ratios may be modified by virtue of having additional click-to-call data and therefore being able to better assess which sets of keywords are driving calls. Using the newly-received call and performance data, the system 105 can calculate additional distribution ratios based on the new click-to-call data using equation (1). The additional distribution ratios can be averaged with the initial distribution ratios in order to arrive at modified distribution ratios. For example, if the initial distribution ratio for a set of keywords was 15%, and new click-to-call data indicated that the distribution ratio for the set of keywords was now 20%, then the system may set the modified distribution ratio for that set of keywords to 17.5%. As additional call and performance data is received by the system 105, the system may continue to average all data to generate modified distribution ratios. Alternatively, the system may weight all click-to-call data, with newly-received click-to-call data having greater impact on the modified distribution ratios than older click-to-call data. For example, data from 72 hours ago may be weighted only 30% whereas data from 24 hours ago may be weighted 70% when calculating modified distribution ratios. It will be appreciated that other mathematical operations can be used to update the distribution ratios as additional data becomes available to the system.

Second, the initial distribution ratios may be modified by taking into account additional characterizing information about the received calls in order to assess the quality of the call. For example, over time the system may determine that calls which exceed a certain duration for a particular advertising campaign are more likely to be indicative of a sale to a consumer and therefore more valuable to the advertiser. As such, the length of time of the call my be used to further adjust the initial distribution ratios. Table 10 reflects an additional assessment by the system of the number of calls within the sampled set that exceed a threshold duration (e.g., 25 seconds) in length. The ratio of the number of calls exceeding the threshold to the originally-assigned number of calls to the set of keywords is referred to as an "effectiveness" factor.

TABLE 9

| Set of keywords | ID | Click-to-call ratio | Distribution based on click-to-call ratio | Number of distributed calls exceeding threshold duration (e.g., 25 seconds) | Effectiveness factor |
| --- | --- | --- | --- | --- | --- |
| Puppy food Seattle | A | 15% (3/20) | 150 | 140 | 93% (140/150) |
| Organic puppy food Washington | B | 20% (4/20) | 200 | 50 | 25% (50/200) |
| Natural puppy food Seattle | C | 15% (3/20) | 150 | 20 | 13% (20/150) |
| Puppy Show Seattle | D | 5% (1/20) | 50 | 10 | 20% (10/50) |
| Best puppy food in Seattle | E | 15% (3/20) | 150 | 200 | 75% (150/250) |
| Cheapest organic puppy food Seattle | F | 30% (6/20) | 300 | 60 | 20% (60/300) |
| Total | | 100% | 1000 | 480 out 1000 | |

Based on the calculated effectiveness factor, the system may elect to modify the initial distribution ratio to account for the overall quality of calls received. The system may modify the distribution ratio by incorporating the effectiveness factor into the calculation of the distribution ratio. For example, for the set of keywords A, the system may determine that the initial distribution ratio of 15% is accurate because 93% of the phone calls assigned to keywords A were considered effective when measured by length by call (as shown in Table 10). Accordingly, the system may maintain the distribution ratio at 15% for keywords A. In contrast, the system may modify the initial distribution ratio for other keywords based on low effectiveness. For example, the distribution for keywords C only has an effectiveness of 13%. In such a case, the system may elect to artificially lower the distribution ratio for keywords C and instead distribute the calls associated with keyword C to other keywords on a pro-rata basis One benefit of modifying the initial distribution ratios based on effectiveness may be to provide a more accurate correlation between phone calls and keywords. The system uses the modified distribution ratios to distribute counts of phone calls after the initial distribution ratio.

In decision step 540, the call analytics system 105 determines whether additional advertising campaigns should be analyzed. If additional campaigns remain to be analyzed, processing continues at step 505 with data associated with a different campaign. Otherwise, processing ends.

While not shown, the call analytics system 105 can transmit recommended adjustments to the sets of keywords to an advertiser 110 or advertising network 115. For example, if the system determines that keywords with an effectiveness of less than 50% are not useful for an ad campaign (e.g., it is more likely than not the phone call received was not valuable to the advertiser), those keywords may be dropped from the advertising campaign on a going-forward basis. Table 11 provides an example of adjustments that may be made to selected keywords as a result of the calculated effectiveness.

TABLE 10

| Set of keywords | ID | Effectiveness | Adjust |
| --- | --- | --- | --- |
| Puppy food Seattle | A | 93% | Keep |
| Organic puppy food Washington | B | 25% | Delete |
| Natural puppy food Seattle | C | 13% | Delete |
| Puppy Show Seattle | D | 20% | Delete |
| Best puppy food in Seattle | E | 75% | Keep |
| Cheapest organic puppy food Seattle | F | 20% | Delete |

It will be appreciated that other call characteristics than length can be used to calculate the effectiveness factor. Some of the other characteristics that the system could use include the content of phone conversations, impression data, average position data, or call or performance data found in FIG. 3A or FIG. 3B. As a general rule, the system may eliminate keywords with an effectiveness of less than 50%, and keep keywords with an effectiveness of greater than 50%.

Moreover, one with ordinary skill in the relevant art will appreciate the technology described in U.S. patent application Ser. No. 13/842,769 can be used in calculating effectiveness. For example, the content of the phone conversation can be used to calculate effectiveness; specifically, if the system determines that the phone call was a "wrong number" or the system determines that a phone call is classified as "no conversion," the system will determine that the phone call was not effective. This calculation will affect the effectiveness factor, and the system will adjust the list of keywords for an ad campaign based on the effectiveness factor. As another example, if the system determines that the content of the phone call was not in English, and the advertiser intends to only advertise to English speakers, the system can use this information to determine that the specific phone call was not effective. Additionally, after calculating the effectiveness factor of sets of keywords, the system can modify the distribution ratio of phone calls as described above using a distribution factor that is weighted by this effectiveness calculation.

From the foregoing, it will be appreciated that specific embodiments of the invention have been described herein for purposes of illustration, but that various modifications may be made without deviating from the scope of the invention. Accordingly, the invention is not limited except as by the appended claims. For example, the system can be implemented in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices, and portions of the invention may reside on a server computer while other portions reside on a client computer. Aspects of the system described herein may be stored or distributed as instructions on computer readable media, including magnetic- and optically-readable and removable computer discs, stored as firmware in chips (e.g., EEPROM chips), or other storage media, and suitable for execution on one or more processors. Those skilled in the art will appreciate that the actual implementation of the data storage area may take a variety of forms, and the phrase "data storage area" is used herein in the generic sense to refer to any area that allows data to be stored in a structured and accessible fashion using such applications or constructs as databases, tables, linked lists, arrays, and so on. Those skilled in the art will further appreciate that the depicted flow charts may be altered in a variety of ways. For example, the order of the steps may be rearranged, steps may be performed in parallel, steps may be omitted, or other steps may be included.

Furthermore, The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

We claim:

1. A method implemented by a computing system to assist in keyword selection for advertising, the method comprising:
receiving call data reflecting phone calls made to telephone numbers associated with an electronic ad campaign;
receiving performance data for sets of keywords associated with the electronic ad campaign, wherein the performance data includes click-to-call data for different sets of keywords;
for each set of keywords, calculating an initial call distribution ratio of a respective number of click-to-call clicks for a set of keywords to a total number of click-to-call clicks reflected in the performance data for all sets of keywords;
for each set of keywords, attributing a portion of the phone calls reflected in the call data to a set of keywords based at least in part on the initial call distribution ratio for that set of keywords;
calculating an estimated performance of each set of keywords based on the portion of the phone calls attributed to a respective set of keywords; and
adjusting the sets of keywords associated with the electronic ad campaign based at least in part on the estimated performance of each set of keywords.

2. The method of claim 1, wherein the performance data further comprises impression data, average position information, advertiser cost information, conversion data, conversation data, or a combination thereof.

3. The method of claim 1, wherein determining the performance of each set of keywords includes estimating an effectiveness of a set of keywords based at least in part on a characteristic of phone calls in the portion of the phone calls attributed to that set of keywords, and wherein adjusting the sets of keywords associated with the electronic ad campaign further includes adjusting the sets of keywords based at least on part on the estimated effectiveness of each set of keywords.

4. The method of claim 3, wherein the characteristic of the phone calls includes call duration, conversation content, conversions, or a combination thereof.

5. The method of claim 3, wherein adjusting the sets of keywords associated with the electronic ad campaign includes deleting a set of keywords from the sets of keywords associated with the electronic ad campaign based at least in part on the estimated effectiveness of that set of keywords.

6. The method of claim 3, further comprising, for each set of keywords, updating the initial call distribution ratio for a set of keywords based on the estimated effectiveness for that set of keywords.

7. The method of claim 1, wherein adjusting the sets of keywords associated with the electronic ad campaign includes deleting a set of keywords from the sets of keywords associated with the electronic ad campaign.

8. The method of claim 1, further comprising:
receiving updated call data and updated performance data for the sets of keywords associated with the electronic ad campaign; and
for each set of keywords, updating the initial call distribution ratio for a set of keywords based at least in part on the received updated call data and performance data.

9. The method of claim 1, further comprising generating a report associated with the electronic ad campaign, wherein the report includes the number of phone calls in each portion of the phone calls attributed to each set of keywords.

10. A non-transitory computer-readable storage medium containing instructions that, when executed by one or more processors, perform a keyword selection method for advertising, the method comprising:
receiving call data characterizing phone calls made to telephone numbers associated with an electronic ad campaign;
receiving performance data for sets of keywords associated with the electronic ad campaign, wherein the performance data includes data characterizing click-to-call clicks for different sets of keywords;
for each set of keywords, calculating an initial call distribution ratio for a set of keywords by dividing a respective number of click-to-call clicks for that set of keywords by a total number of click-to-call clicks reflected in the performance data for all sets of keywords;

for each set of keywords, calculating an estimated performance of a set of keywords based at least in part on the initial call distribution ratio of that set of keywords; and recommending changes to keyword selection associated with the electronic ad campaign based at least in part on the estimated performances.

11. The non-transitory computer-readable storage medium of claim 10, wherein the performance data further comprises, for each set of keywords, a number of clicks, conversion data, impression data, or a combination thereof.

12. The non-transitory computer-readable storage medium of claim 10, further comprising, for each set of keywords, attributing a portion of the phone calls characterized in the call data to a set of keywords based at least in part on the initial call distribution ratio for that set of keywords.

13. The non-transitory computer-readable storage medium of claim 12, wherein determining the performance of a set of keywords includes determining the performance of the set of keywords based at least in part on the portion of the phone calls attributed to that set of keywords.

14. The non-transitory computer-readable storage medium of claim 12, wherein:

determining the performance of a set of keywords includes estimating an effectiveness of the set of keywords based on a characteristic of phone calls attributed to that set of keywords; and recommending changes to the keyword selection associated with the ad campaign includes recommending changes based on the estimated effectiveness of each set of keywords.

15. The non-transitory computer-readable storage medium of claim 14, wherein the characteristic of the phone calls is a duration of the phone calls, a number of conversions resulting from the phone calls, or a combination thereof.

16. The non-transitory computer-readable storage medium of claim 14, further comprising, for each set of keywords:

receiving updated performance data and updated call data for the sets of keywords associated with the electronic ad campaign;

updating the estimated effectiveness of a set of keywords based on the updated performance data and the updated call data; and updating the initial call distribution ratio of the set of keywords based at least in part on the updated estimated effectiveness.

17. The non-transitory computer-readable storage medium of claim 10, further comprising:

receiving updated performance data and updated call data for the sets of keywords associated with the electronic ad campaign; and for each set of keywords, updating the initial call distribution ratio of a set of keywords based at least in part on the updated performance data and the updated call data.

18. The non-transitory computer-readable storage medium of claim 10, wherein recommending changes to keyword selection associated with the electronic ad campaign includes recommending deletion of a set of keywords from the sets of keywords associated with the electronic ad campaign.

19. The non-transitory computer-readable storage medium of claim 10, further comprising generating a report that includes a number of phone calls attributed to each set of keywords based at least in part on the initial call distribution ratio of each set of keywords.

20. A method, comprising:

receiving call data reflecting phone calls made to telephone numbers associated with an electronic ad campaign;

receiving performance data for sets of keywords associated with the electronic ad campaign, wherein the performance data reflects a respective number of click-to-call clicks for each of the sets of keywords;

for each set of keywords, calculating an initial call distribution ratio of a respective number of click-to-call clicks reflected in the performance data for a set of keywords to a total number of click-to-call clicks reflected in the performance data for all sets of keywords;

for each set of keywords, attributing a portion of the phone calls reflected in the call data to a set of keywords based at least in part on the initial call distribution ratio for that set of keywords;

for each set of keywords, modifying the initial call distribution ratio for a set of keywords based at least in part on a characteristic of each phone call in the portion of the phone calls attributed to that set of keywords; and adjusting the sets of keywords associated with the electronic ad campaign based at least in part on the modified initial call distribution ratios.

* * * * *